US011497195B2

(12) United States Patent
Iles

(10) Patent No.: US 11,497,195 B2
(45) Date of Patent: Nov. 15, 2022

(54) POULTRY BEHAVIORAL DEVELOPMENT SYSTEM

(71) Applicant: Dog Gon Wild, Inc., Hampton, VA (US)

(72) Inventor: Roger W. Iles, Hampton, VA (US)

(*) Notice: Subject to any disclaimer, the term of this patent is extended or adjusted under 35 U.S.C. 154(b) by 196 days.

(21) Appl. No.: 17/084,260

(22) Filed: Oct. 29, 2020

(65) Prior Publication Data
US 2022/0132809 A1 May 5, 2022

(51) Int. Cl.
*A01K 31/12* (2006.01)

(52) U.S. Cl.
CPC .................... *A01K 31/12* (2013.01)

(58) Field of Classification Search
CPC ........ A01K 31/12; A01K 31/00; A01K 45/00; A01K 31/18; H02G 3/125; F16B 2/065; F16B 2/02
USPC ................. 248/200.1, 224.14, 228.7, 228.6
See application file for complete search history.

(56) References Cited

U.S. PATENT DOCUMENTS

| | | | | |
|---|---|---|---|---|
| 742,699 A * | 10/1903 | Mattox | ................. | A01K 31/04 119/534 |
| 902,393 A * | 10/1908 | Frantz | ................. | A01K 31/12 119/532 |
| 1,018,007 A * | 2/1912 | Rogers | ................. | A01K 31/18 119/491 |
| 1,044,994 A * | 11/1912 | Cox | ................. | A01K 31/12 119/534 |
| 1,470,799 A * | 10/1923 | Bartman | ................. | A01K 31/12 119/534 |
| 1,537,086 A * | 5/1925 | Ischenhouser | ......... | A01K 31/12 119/532 |
| 1,598,159 A * | 8/1926 | Skinner | ................. | A01K 31/12 119/535 |
| 2,011,539 A | 8/1935 | John | | |
| 2,078,593 A | 4/1937 | Broadfoot et al. | | |
| 2,096,241 A | 10/1937 | Edward | | |
| 2,292,020 A | 8/1942 | Joseph | | |
| 2,369,316 A | 2/1945 | Scott | | |
| 2,471,675 A | 5/1949 | De | | |
| 3,398,719 A * | 8/1968 | Walker | ................. | A01K 31/12 119/468 |
| 5,845,886 A * | 12/1998 | McCormick | ............ | H02G 3/20 416/246 |
| 6,412,439 B1 | 7/2002 | Otto-Lübker et al. | | |
| 6,526,914 B2 | 3/2003 | Korsten | | |
| 7,658,165 B2 | 2/2010 | Lorton et al. | | |
| 7,966,974 B2 | 6/2011 | Lorton et al. | | |
| 10,477,840 B2 | 11/2019 | Auffarth | | |
| 10,674,713 B2 | 6/2020 | Teunissen | | |
| 2002/0121245 A1 | 9/2002 | Korsten | | |
| 2007/0012847 A1 * | 1/2007 | Tai | .......................... | E04B 9/006 248/200.1 |

(Continued)

*Primary Examiner* — Timothy D Collins
*Assistant Examiner* — Maria E Graber
(74) *Attorney, Agent, or Firm* — Olav M. Underdal; IDP Patent Services

(57) ABSTRACT

A poultry behavioral development system includes a left end plate and right end plate; a top beam, attachable to upper ends of the left end plate and right end plate; a plurality of connection assemblies, which each include a connection beam that detachably attaches between the left end plate and right end plate; such that preadolescent poultry perch and jump between the top beam and the plurality of connection beams.

19 Claims, 6 Drawing Sheets

Poultry Behavioral Development System

(56) References Cited

U.S. PATENT DOCUMENTS

| | | | |
|---|---|---|---|
| 2007/0200039 A1* | 8/2007 | Petak | H02G 3/125 248/298.1 |
| 2015/0083051 A1 | 3/2015 | Foreman et al. | |
| 2018/0170968 A1 | 6/2018 | Bralkowski et al. | |
| 2019/0116765 A1* | 4/2019 | Teunissen | A01K 39/014 |

* cited by examiner

Poultry Behavioral Development System

POULTRY BEHAVIORAL DEVELOPMENT SYSTEM

CROSS-REFERENCE TO RELATED APPLICATIONS

N/A.

FIELD OF THE INVENTION

The present invention relates generally to the field of poultry, and more particularly to a system for poultry behavioral development.

BACKGROUND OF THE INVENTION

In relation to care of pets and companion animals, providing the right type of environment, nutrition, and behavioral stimulation to keep that animal in good health is an important goal.

When raising young poultry, such as chickens, introducing new chicks to an existing flock can create problems for the young chicks. The expansion of backyard flocks in urban areas has particularly developed the need to interact and create human-animal bond. As chickens are social animals and positive social maturity occurs in the first year, it is important to create a positive social interaction prior to them joining the existing flock.

However, there are no available tools specifically designed to promote and encourage the development of their social skills and positive interaction as well as motor skills for perching and roosting.

As such, considering the foregoing, it may be appreciated that there continues to be a need for novel and improved devices and methods for poultry behavioral development.

SUMMARY OF THE INVENTION

The foregoing needs are met, to a great extent, by the present invention, wherein in aspects of this invention, enhancements are provided to the existing model of poultry behavioral development systems.

In an aspect, a poultry behavioral development system can include:
a) a left end plate;
b) a right end plate;
c) a top beam, which can be attached to upper ends of the left end plate and the right end plate, such that a center portion of the top beam can be mounted between the left end plate and the right end plate;
  such that preadolescent poultry can perch on the top beam; and
d) a plurality of connection assemblies, which can each include:
  i. a connection beam, which can be detachably attached between the left end plate and the right end plate, such that the preadolescent poultry can perch on the connection beam;
whereby the preadolescent poultry can be enabled to jump between the top beam and connection beams of the plurality of connection assemblies; and
whereby the connection beams can be positionally adjustable between the left end plate and right end plate, such that the connection beams can be initially positioned lower and adjusted higher as the preadolescent poultry grows, in order to challenge the preadolescent poultry.

In another aspect, the poultry behavioral development system can further include:
a) a left top beam mount, which can be connected to a top end of the left end plate, such that the left top beam mount can secure the top beam to the upper end of the left end plate; and
b) a right top beam mount, which can be connected to a top end of the left end plate, such that the right top beam mount can secure the top beam to the upper end of the right end plate.

In yet another aspect, each of the connection assemblies can further include:
a) a left connection beam mount, which can be configured to detachably attach to an inner side of the left end plate, such that the left connection beam mount can hold a left end of the connection beam; and
b) a right connection beam mount, which can be configured to detachably attach to an inner side of the right end plate, such that the right connection beam mount can hold a right end of the connection beam.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1A:
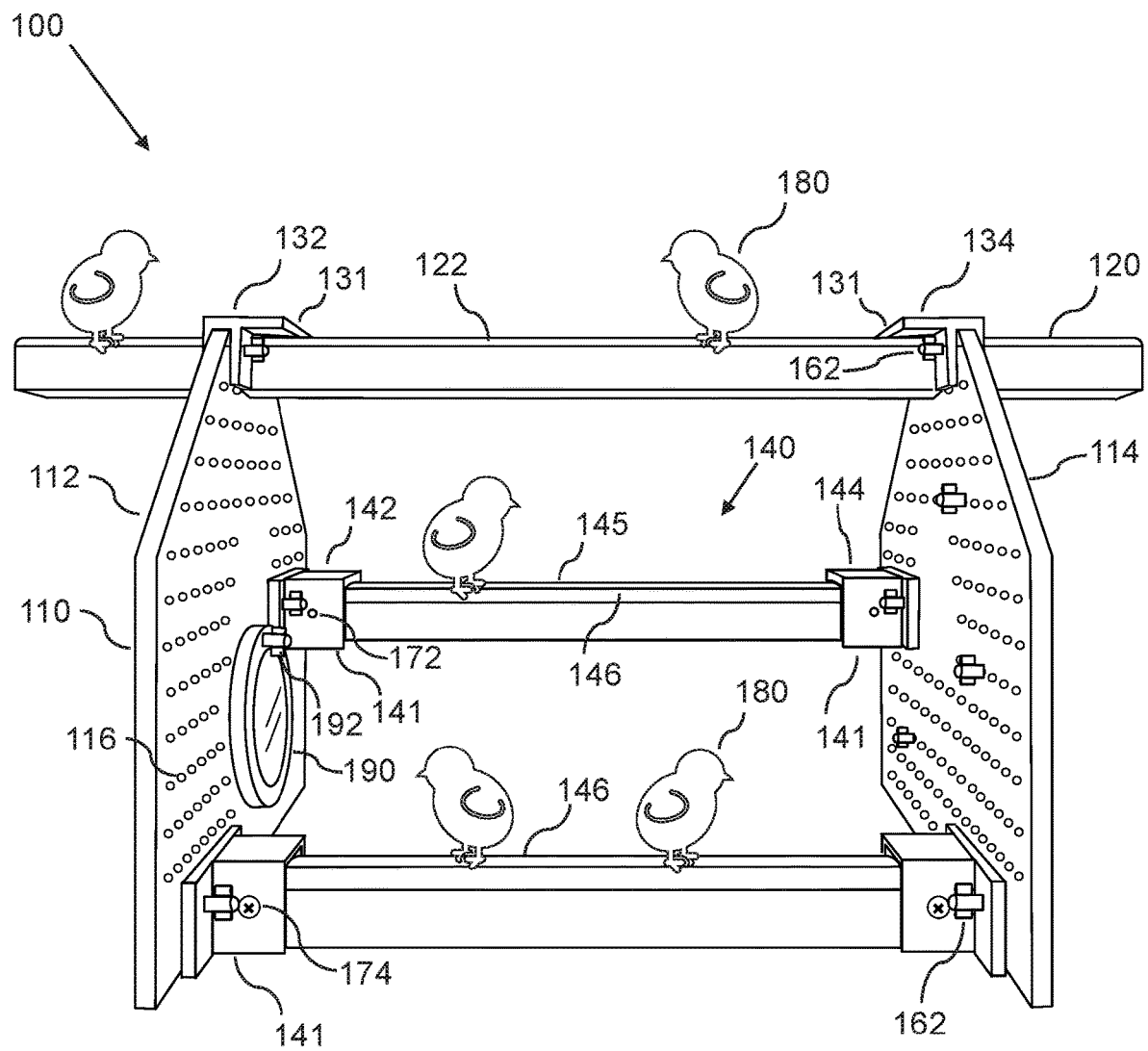
FIG. 1A is a front view of a poultry behavioral development system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a poultry behavioral development system 100 with reference to FIG. 1, in such manner that like reference numerals refer to like components throughout; a convention that we shall employ for the remainder of this specification.

In an embodiment, as shown in FIG. 1A, a poultry behavioral development system 100 can include:
a) a left end plate 112; and
b) a right end plate 114; and
c) a top beam 120, which can be attached to upper ends of the left end plate 112 and the right end plate 114, such that a center portion of the top beam 120 can be mounted between the left end plate 112 and the right end plate 114;
such that preadolescent poultry 180 can be enabled to perch on the top beam 120; and
d) a plurality of connection assemblies 140, which can each include:
i. a connection beam 145, which can be detachably attached between the left end plate 112 and the right end plate 114, such that the preadolescent poultry 180 are enabled to perch on the connection beam 145;
whereby the preadolescent poultry 180 can be enabled to jump between the top beam 120 and connection beams 145 of the plurality of connection assemblies 140; and
whereby the connection beams 145 can be positionally adjustable between the left end plate 112 and the right end plate 114, such that the connection beams 145 can be initially positionable lower and adjustable higher as the preadolescent poultry 180 grows, in order to challenge and promote development of the preadolescent poultry 180.

In various related embodiments, the poultry behavioral development system 100 can be used for behavioral and physical development of preadolescent poultry, typically such as one to eight week old chickens, which are also commonly referred to as "peeps" or "chicks". Although primarily intended for use with preadolescent poultry, the poultry behavioral development system 100 may also be configured in larger sizes for use with adolescent poultry (such as chickens) or mature poultry (such as hens and/or roosters).

In various related embodiments, the poultry behavioral development system 100 can be used a behavioral interactive tool that promotes development beyond the base behaviors by providing stimulation and enrichment through social interaction that aids in the pre-development of the chick into coop life. The poultry behavioral development system 100 is a social interaction and development tool for young fowl, including chickens and guineas. The poultry behavioral development system 100 is comprised of two injection molded polymer pegboard style, barn shaped sides with three wooden perches specifically shaped for young chicks. It includes six adjustable brackets, also of injection molded polymer. The entire structure is washable. The poultry behavioral development system 100 encourages the development of their social skills and positive interaction as well as motor skills for perching and roosting.

Figure 3A:
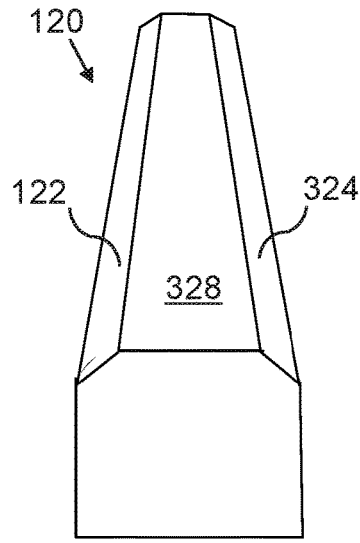
FIG. 3A is a front perspective view of a top beam, according to an embodiment of the invention.
Figure 3B:
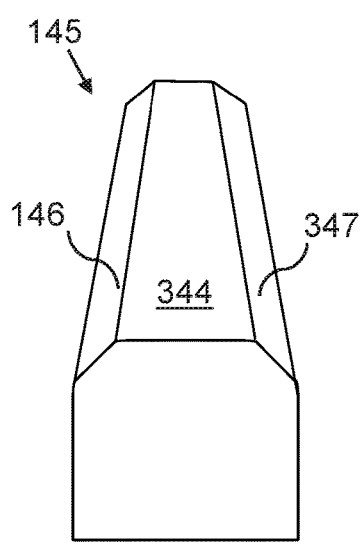
FIG. 3B is a front perspective view of a connection beam, according to an embodiment of the invention.
Figure 3E:
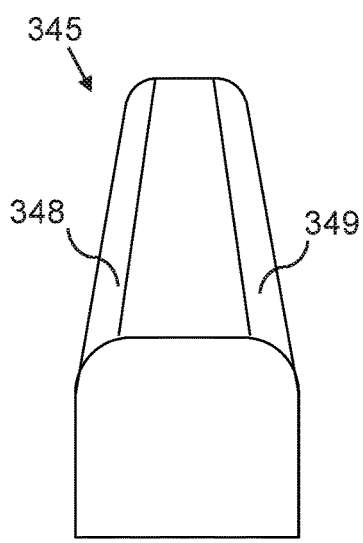
FIG. 3E is a front perspective view of a connection beam, according to an embodiment of the invention.
Figure 3C:
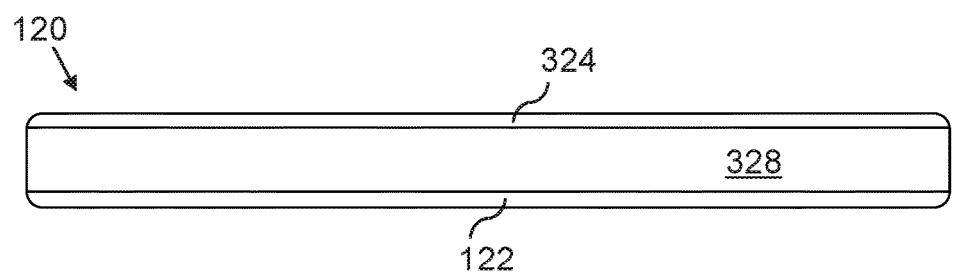
FIG. 3C is top view of a top beam, according to an embodiment of the invention.
Figure 3D:
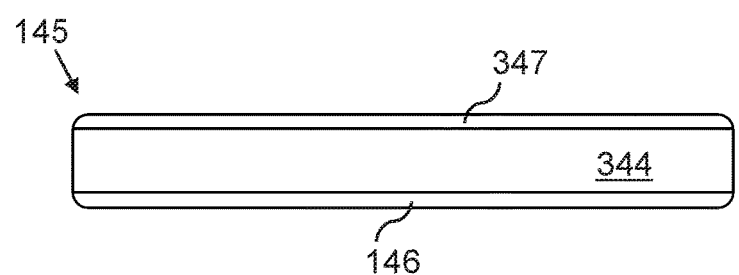
FIG. 3D is top view of a connection beam, according to an embodiment of the invention.

In a related embodiment, as shown in FIGS. 1A, 3C, and 3D, the top beam 120 can be configured with a length that is longer than a length of each of the connection beams 145, wherein the length of each of the connection beams 145 can be uniform, such that the top beam 120 can be configured to extend beyond outer sides of the left end plate 112 and right end plate 114.

In an embodiment, as shown in FIGS. 1A, 3A, and 3C, the top beam 120 can be configured with a front beveled edge 122 and a rear beveled edge 324 on an upper surface 328 of the top beam 120, whereby the top beam 120 can provide an improved grip and promote healthy development of feet of the preadolescent poultry 180. The beveled edges 122, 324 can be slightly rounded.

In an embodiment, as shown in FIGS. 1A, 3B, and 3D, each of the connection beams 145 can be configured with a front beveled edge 146 and a rear beveled edge 347 on an upper surface 344 of each connection beam 145, whereby the connection beams 145 can provide an improved grip and promote healthy development of feet of the preadolescent poultry 180.

Alternatively, as shown in FIG. 3E, the top beam 120 and/or can be configured with a front rounded edge 348 and a rear rounded edge 349.

In an embodiment, as shown in FIGS. 1A, 1B, 2A, 2B, and 2C, each corresponding end plate of the left end plate 112 and right end plate 114 can include:
a) a notch 210, which can be positioned in an upper end of the corresponding end plate, such that the notch 210 can be configured to receive the top beam 120;
such that the top beam 120 can protrude through a left notch 210 of the left end plate 112 and through a right notch 210 of the right end plate 114.

In an embodiment, as shown in FIGS. 1A, 1B, 4A, 4B, and 4C, the poultry behavioral development system 100 can further include:

a) a left top beam mount 132, which can be connected to a top end of the left end plate 112, such that the left top beam mount 132 secures the top beam 120 to the upper end of the left end plate 112; and b) a right top beam mount 134, which can be connected to a top end of the left end plate 112, such that the right top beam mount 134 secures the top beam 120 to the upper end of the right end plate 114.

Figure 1B:
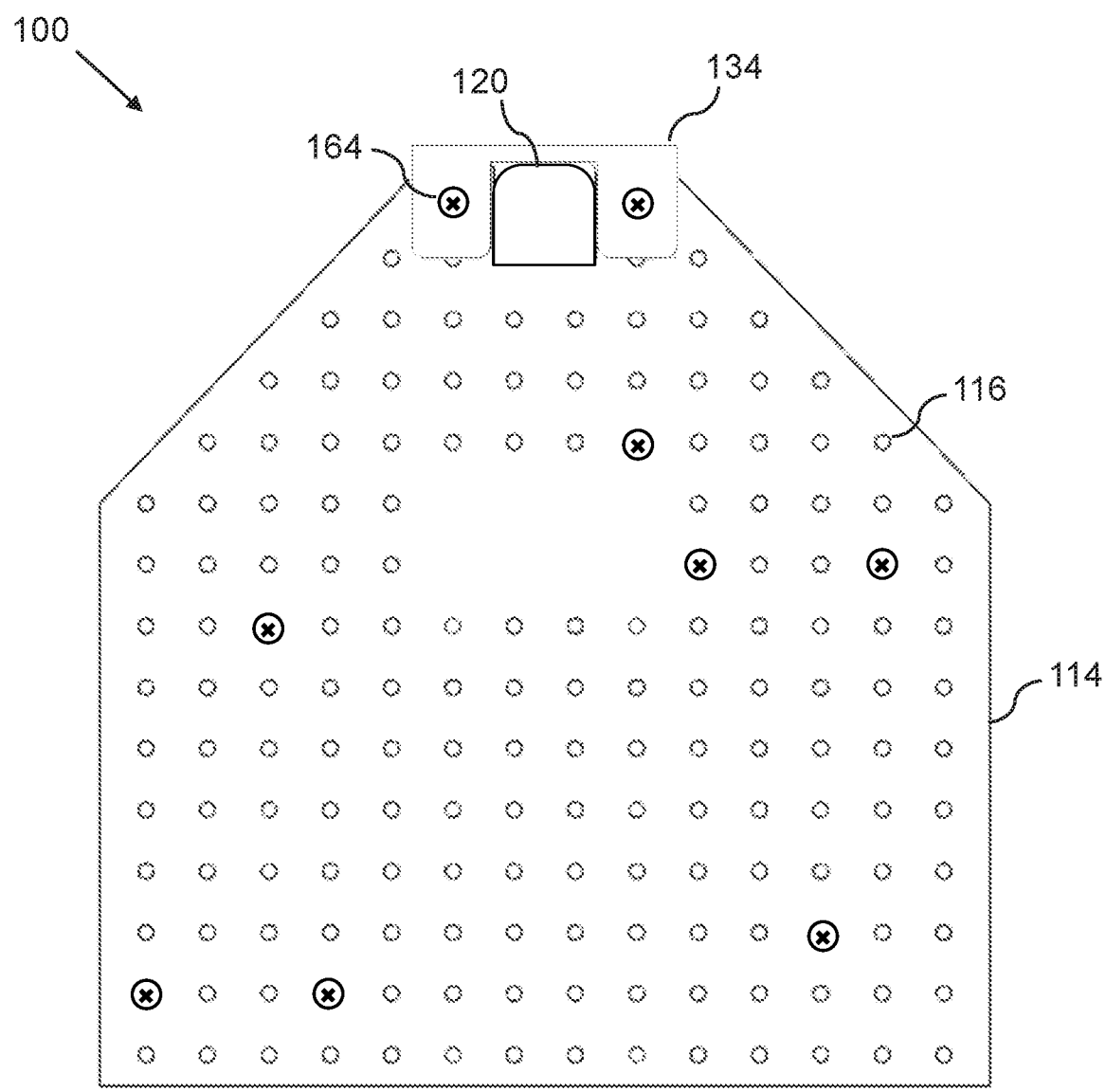
FIG. 1B is a rear view of a right end plate, according to an embodiment of the invention.
Figure 2A:
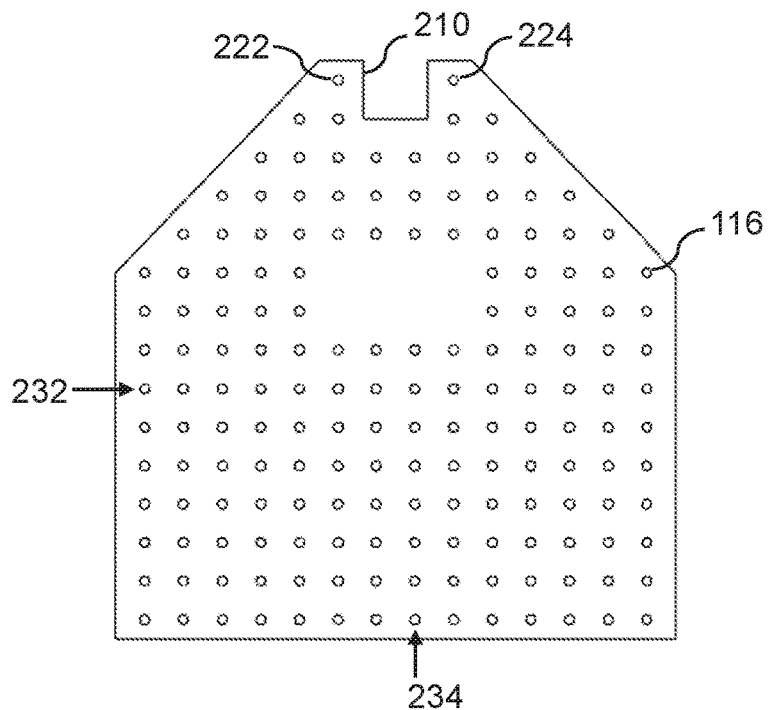
FIG. 2A is a front view of an end plate, according to an embodiment of the invention.
Figure 2B:
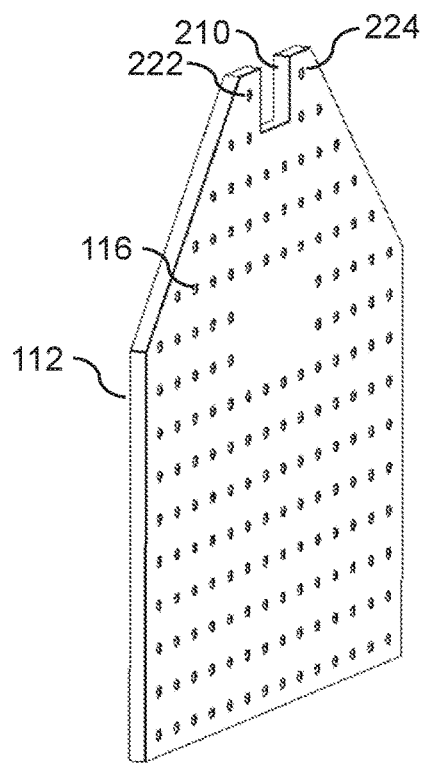
FIG. 2B is a perspective view of a left end plate, according to an embodiment of the invention.
Figure 2C:
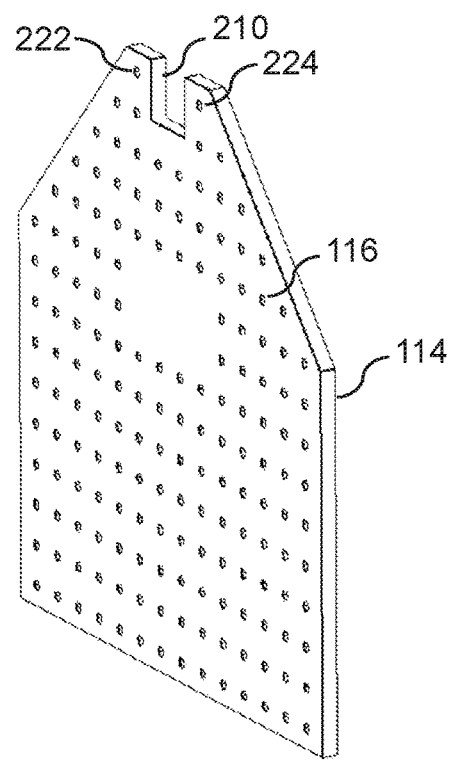
FIG. 2C is a perspective view of a right end plate, according to an embodiment of the invention.

In a related embodiment, as shown in FIGS. 1A, 1B, 4A, 4B, and 4C, each corresponding top beam mount 131 of the left top beam mount 132 and the right top beam mount 134 can include:

a) a top plate 432; and b) a front and a rear protruding flange assembly 440, 450, wherein each corresponding flange assembly of the front and rear protruding flange assemblies 440, 450 can include:

i. an outer flange portion 442, which can be connected to a bottom surface of the top plate 432, such that the outer flange portion 442 can protrude downward from the top plate 432; and ii. an inner flange portion 444, which can be connected to the bottom surface of the top plate 432, such that the inner flange portion 444 can protrude downward from the top plate 432;

wherein the outer flange portion 442 and inner flange portion 444 can be parallel and configured with a uniform distance, such that the corresponding flange assembly can be configured to slide over a top end of a corresponding end plate of the left and right end plates 112, 114, such that the corresponding top beam mount 131 can be configured to slide over and attach to the top end of the corresponding end plate;

wherein the front protruding flange assembly 440 and the rear protruding flange assembly 450 can each be configured with a corresponding beam gap 460 between the front flange assembly 440 and the rear protruding flange assembly 450, such that the top beam 120 can protrude through the corresponding beam gap 460;

such that the corresponding beam gap 460 is aligned with the corresponding notch 210, as shown in FIGS. 1A and 1B;

such that when the left top beam mount 132 slides over the top end of the left end plate 112 and the right top beam mount 134 slides over the top end of the right end plate 114, the top beam 120 can be inserted into a left beam gap 460 and a right beam gap 460 of respectively the left top beam mount 132 and the right top beam mount 134;

whereby the top plate 432 of the left top beam mount 132 can prevent the top beam 120 from sliding upwards out of the left beam gap 460 and the top plate 432 of the right top beam mount 134 can prevent the top beam 120 from sliding upwards out of the right beam gap 460.

Figure 4A:
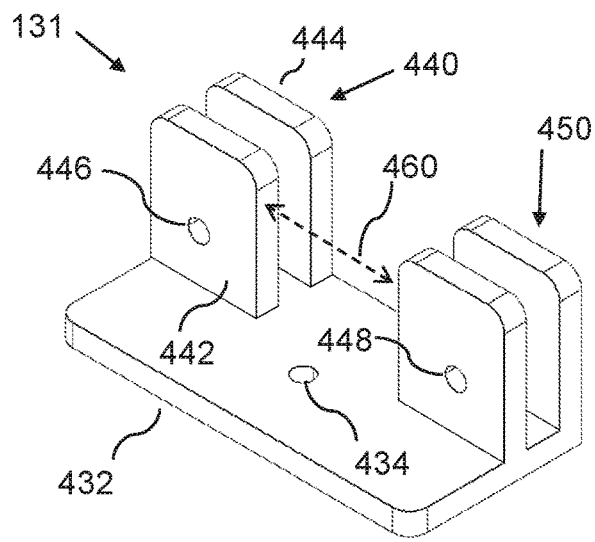
FIG. 4A is a top perspective view of a top beam mount, according to an embodiment of the invention.
Figure 4B:
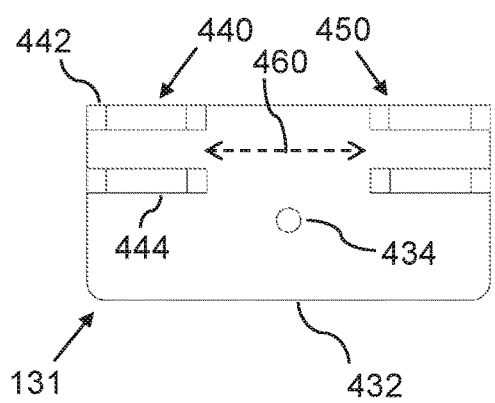
FIG. 4B is a top view of a top beam mount, according to an embodiment of the invention.
Figure 4C:
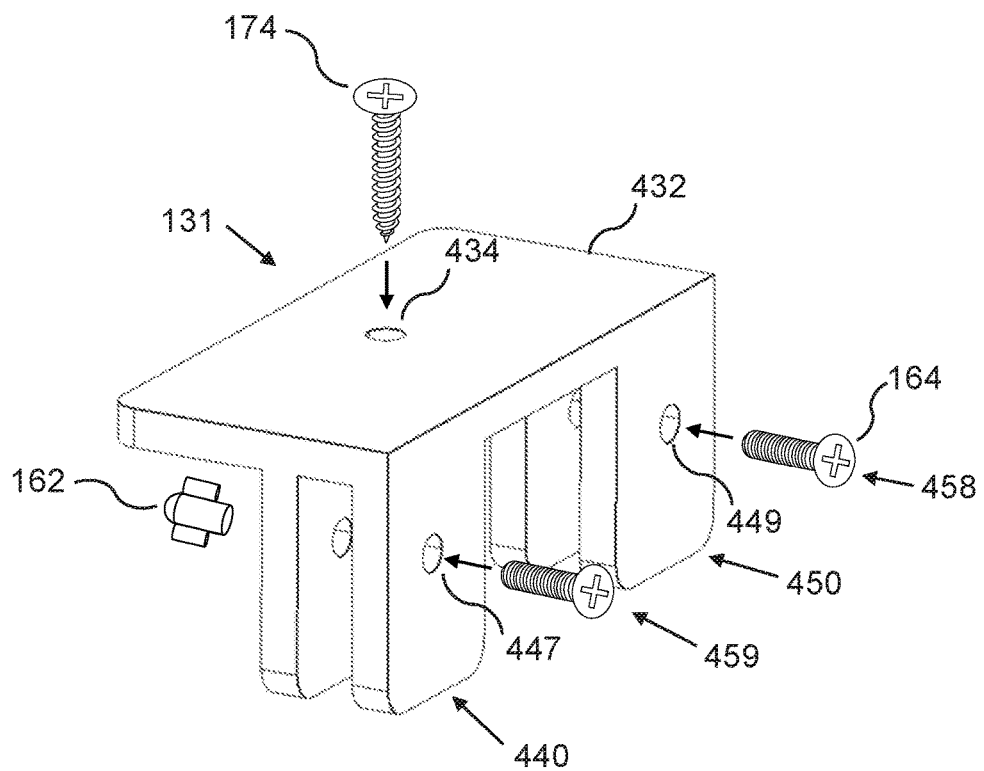
FIG. 4C is a bottom perspective view illustrating a top beam mount, front fastener, rear fastener, and screw before the assembly of the poultry behavioral development system, according to an embodiment of the invention.

In an embodiment, as shown in FIGS. 4A, 4B, and 4C, each corresponding top plate 432 of the left top beam mount 132 and right top beam mount 134 can include:

a) a screw aperture 434, which can protrude through the corresponding top plate 432, such that the screw aperture 434 can provide access to the top beam 120, when the top beam 120 is inserted through the left beam gap of the left top beam mount 132 and the right beam gap of the right top beam mount 134;

wherein the poultry behavioral development system 100 can further comprise a plurality of beam screws 174;

such that each beam screw 174 can be configured to be insertable through the screw aperture 434, such that the beam screw 174 can be screwed into the top beam 120, whereby the beam screw 174 can prevent lateral movement of the top beam 120.

In an embodiment, as shown in FIGS. 1A, 1B, 2A, 2B, 2C, 4A, 4B, and 4C, each corresponding end plate of the left end plate 112 and right end plate 114 can include:

a front connection hole 222 and a rear connection hole 224, which can each protrude through a top end of the corresponding end plate, such that the front connection hole 222 can be positioned on the front side of a corresponding notch 210, and the rear connection hole 224 can be positioned on the rear side of the corresponding notch 210; and wherein the front and rear protruding flange assemblies 440, 450 can each include:

inner and outer flange holes 446, 447, which can protrude through the inner flange portion 442 and the outer flange portion 444, respectively, such that when the left top beam mount 132 and right top beam mount 134 are slid over a top of corresponding end plates, the flange holes 446 of the outer flange portion 442 can be configured to align with the right connection hole 224, and the flange holes 446 of the inner flange portion 444 can be configured to align with the left connection hole 222;

wherein the poultry behavioral development system 100 can further include:

a front fastener 459, which protrudes through:
front respective inner and outer flange holes 446, 447 of the front protruding flange assembly 440; and
the front connection hole 222; and a rear fastener 458, which protrudes through:
rear respective inner and outer flange holes 448, 449 of the rear protruding flange assembly 450; and
the rear connection hole 224; and such that the front and rear fasteners detachably attach the left top beam mount to the left end plate and the right top beam mount to the right end plate.

In a related embodiment, as shown in FIG. 4C, the front fastener 459 and the rear fastener 458 can each be configured as a screw 164 and a nut 162, which can be a wing nut 162.

In an embodiment, as shown in FIGS. 1A, 5A, 5B, and 5C, each of the connection assemblies 140 can further include:

a) a left connection beam mount 142, which can be configured to detachably attach to an inner side of the left end plate 112, such that the left connection beam mount 142 can be configured to hold a left end of the connection beam 145; and b) a right connection beam mount 144, which can be configured to detachably attach to an inner side of the right end plate 114, such that the right connection beam mount 144 can be configured to hold a right end of the connection beam 145.

In a related embodiment, as shown in FIGS. 1A, 5A, 5B, and 5C, the left connection beam mount 142 and right connection beam mount 144 can each include:

a) a base plate 542; and b) a receiving structure 544, which protrudes inward from the base plate 542, such that the receiving structure 544 defines a receiving interior 545, which can protrude from the base plate 542, such that the receiving interior 545 of the left connection beam mount 142 can be configured to receive a left end of the connection beam 145, and the receiving interior 545 of the right connection beam mount 144 can be configured to receive a right end of the connection beam 145.

In an embodiment, as shown in FIGS. 1A, 5A, 5B, and 5C, each corresponding receiving structure 544 of the left connection beam mount 142 and the right connection beam mount 144 can include:

a) at least one screw aperture 172, such that the at least one screw aperture 172 can protrude through at least one side of the corresponding receiving structure 544, such that the at least one screw aperture 172 can provide access to a corresponding end of the connection beam 145, when the corresponding end of the connection beam 145 is inserted into the corresponding receiving interior 545;

wherein the poultry behavioral development system 100 can further include a plurality of beam screws 174;

such that each beam screw 174 can be configured to be insertable through the at least one screw aperture 172, such that the beam screw 174 can be screwed into the corresponding end of the connection beam 145, whereby the beam screw 174 can prevent lateral movement of the corresponding end of the connection beam 145.

In an embodiment, as shown in FIGS. 1A, 1B, 2A, 2B, 2C, 5A, 5B, and 5C, each corresponding end plate 112, 114 of the left end plate 112 and the right end plate 114 can include:

a) a plurality of end plate holes 116, which can each protrude through the corresponding end plate 112, 114, such that the end plate holes 116 span the surface of the corresponding end plate 112, 114 in a series of equidistant rows 232 and columns 234; and wherein each corresponding beam mount 142, 144 of the left connection beam mount 142 and the right connection beam mount 144 can further include:

b) first and second connection beam mount holes 548, 549, which can each protrude through the base plate 542, such that the first and second connection beam mount holes 548, 549 can be positioned to align with corresponding end plate holes 116 spaced two holes 116 apart, i.e. such that there are two holes 116 between the corresponding end plate holes 116;

wherein the poultry behavioral development system 100 can further include:

first and second fasteners 558, 559, which protrude through the first and second connection beam mount holes 548, 549, and the corresponding end plate holes 116, respectively, such that the first and second fasteners 558, 559 secure the corresponding beam mount 142, 144 to the corresponding end plate 112, 114.

Figure 5A:
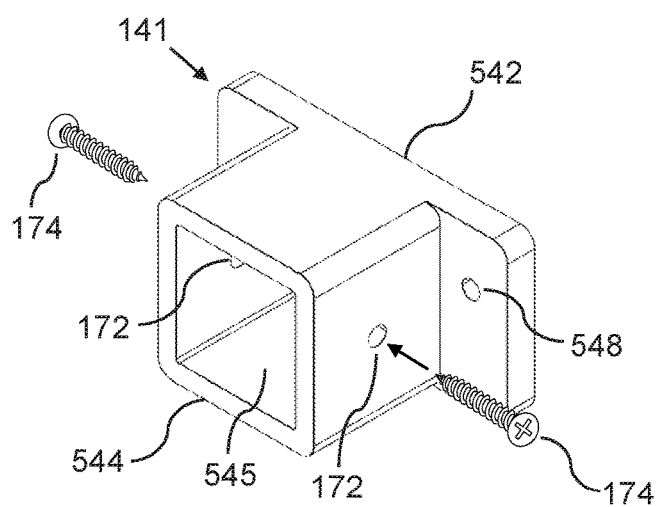
FIG. 5A is a top perspective view illustrating a connection beam mount and screw before the assembly of the poultry behavioral development system, according to an embodiment of the invention.
Figure 5B:
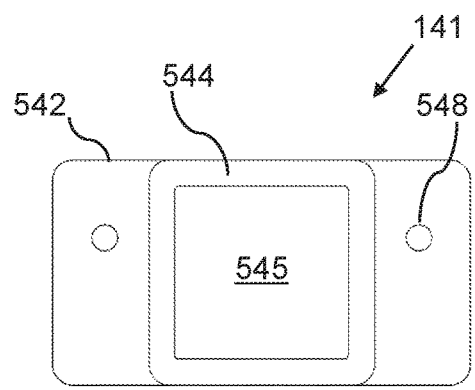
FIG. 5B is a top view of a connection beam mount, according to an embodiment of the invention.
Figure 5C:
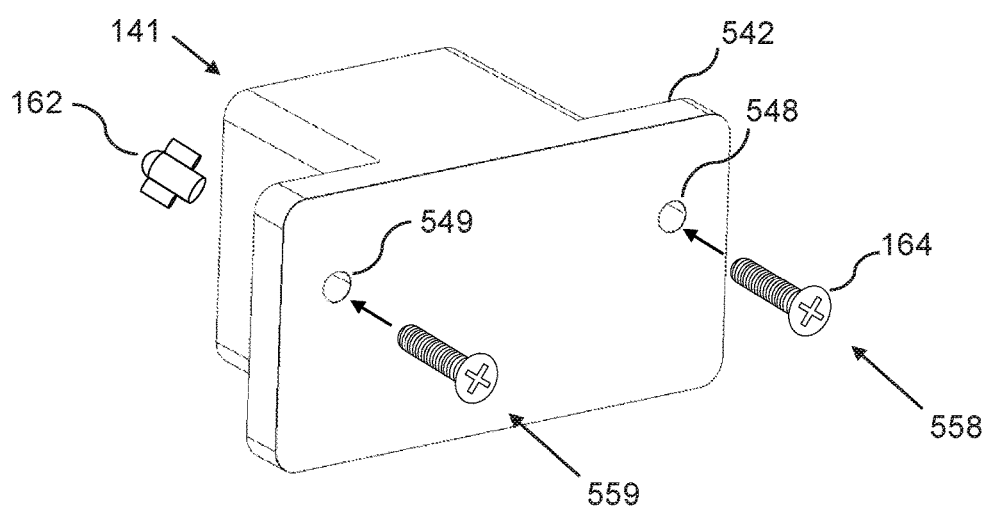
FIG. 5C is a bottom perspective view illustrating a connection beam mount, front fastener, and rear fastener before the assembly of the poultry behavioral development system, according to an embodiment of the invention.

In a related embodiment, as shown in FIG. 5C, the front fastener 164 can be configured as a screw and the rear fastener 162 can be configured as a wing nut, such that an end portion of the screw can protrude through an outer end of the left end plate 112 or an outer end of the right end plate 114, such that the end portion of the screw can be secured using a wing nut, such that the first and second fasteners 558, 559, can each be configured as a screw and a wing nut. Alternatively, the first and second fasteners 558, 559 can each be configured as a machine screws 558, 559 that screw into threaded end plate holes 116, self-threading screws, or snap lock fasteners, or other well-known types of fasteners.

In an embodiment, as shown in FIG. 1A, the poultry behavioral development system 100 can further include:

a) at least one accessory 190, such as a mirror 190 or drinking trough, wherein the accessory 190 can be detachably attached to the left end plate 112 or the right end plate 114;

wherein the poultry behavioral development system 100 further comprises:

a fastener 192;

wherein the at least one accessory 190 is detachably attached to the corresponding end plate, such that the fastener protrudes through the at least one accessory 190 and a corresponding end plate hole in the plurality of end plate holes 116.

In an embodiment, the top beam 120 and plurality of connection beams 145 can be made of wood, and the top beam mounts 131 and plurality of connection beam mounts 141, 142, 144 can be made of plastic.

In an embodiment, the left end plate 112 and the right end plate 114 can be made of a light metal alloy, plastic, or wood.

Here has thus been described a multitude of embodiments of the poultry behavioral development system 100, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A poultry behavioral development system, comprising:

a) a left end plate;

b) a right end plate;

c) a top beam, which is attached to upper ends of the left end plate and the right end plate, such that a center portion of the top beam is mounted between the left end plate and the right end plate;

such that preadolescent poultry are enabled to perch on the top beam;

d) a left top beam mount, which is connected to a top end of the left end plate, such that the left top beam mount secures the top beam to the upper end of the left end plate;

e) a right top beam mount, which is connected to a top end of the right end plate, such that the right top beam mount secures the top beam to the upper end of the right end plate; and f) a plurality of connection assemblies, each comprising:

a connection beam, which is detachably attached between the left end plate and the right end plate, such that the preadolescent poultry are enabled to perch on the connection beam;

wherein each corresponding top beam mount of the left top beam mount and the right top beam mount comprises:

a top plate; and a front protruding flange assembly and a rear protruding flange assembly, wherein each corresponding flange assembly of the front and rear protruding flange assembly comprises:

an outer flange portion, which is connected to a bottom surface of the top plate, such that the outer flange portion protrudes downward from the top plate; and an inner flange portion, which is connected to the bottom surface of the top plate, such that the inner flange portion protrudes downward from the top plate;

wherein the outer flange portion and the inner flange portion are parallel and configured with a uniform distance, such that the corresponding flange assembly is configured to slide over a top end of a corresponding end plate of the left and right end plates, such that the corresponding top beam mount is configured to slide over and attach to the top end of the corresponding end plate;

wherein the front protruding flange assembly and the rear protruding flange assembly are each configured with a corresponding beam gap between the front protruding flange assembly and the rear protruding flange assembly, such that the top beam protrudes through the corresponding beam gap;

whereby, when the left top beam mount slides over the top end of the left end plate and the right top beam mount slides over the top end of the right end plate, the top beam is insertable into a left beam gap and a right beam gap of respectively the left top beam mount and the right top beam mount; and whereby the top plate of the left top beam mount prevents the top beam from sliding upwards out of the left beam gap and the top plate of the right top beam mount prevents the top beam from sliding upwards out of the right beam gap;

whereby the preadolescent poultry are enabled to jump between the top beam and connection beams of the plurality of connection assemblies; and whereby the connection beam is positionally adjustable between the left end plate and the right end plate, whereby connection beams of the plurality of connection assemblies are initially positionable lower and adjustable higher as the preadolescent poultry grows, in order to promote development of the preadolescent poultry.

2. The poultry behavioral development system of claim 1, wherein the top beam is configured to extend beyond outer sides of the left end plate and the right end plate.

3. The poultry behavioral development system of claim 1, wherein the top beam is configured with a front beveled edge and a rear beveled edge on an upper surface of the top beam, whereby the top beam provides an improved grip and promotes healthy development of feet of the preadolescent poultry.

4. The poultry behavioral development system of claim 1, wherein the connection beam is configured with a front beveled edge and a rear beveled edge on an upper surface of the connection beam, whereby the connection beam provides an improved grip and promotes healthy development of feet of the preadolescent poultry.

5. The poultry behavioral development system of claim 1, wherein each corresponding end plate of the left end plate and the right end plate comprises:

a notch, which is positioned in an upper end of the corresponding end plate, such that the notch is configured to receive the top beam;

such that the top beam protrudes through a left notch of the left end plate and protrudes through a right notch of the right end plate.

6. The poultry behavioral development system of claim 1, wherein each corresponding top plate of the left top beam mount and the right top beam mount comprises:

a screw aperture, which protrudes through the corresponding top plate, such that the screw aperture provides access to the top beam, when the top beam is inserted through the left beam gap of the left top beam mount and the right beam gap of the right top beam mount;

wherein the poultry behavioral development system further comprises a plurality of beam screws;

such that each beam screw is configured to be insertable through the screw aperture, such that the beam screw is screwed into the top beam, whereby the beam screw prevents lateral movement of the top beam.

7. The poultry behavioral development system of claim 1, wherein each corresponding end plate of the left end plate and right end plate comprises:

a front connection hole and a rear connection hole, which each protrude through a top end of the corresponding end plate;

wherein the outer flange portion and inner flange portion of the front and rear protruding flange assemblies each comprise:

inner and outer flange holes, which protrude through the inner flange portion and the outer flange portion, respectively, such that when the left top beam mount and right top beam mount are slid over corresponding end plates, the flange holes of the outer flange portion align with the right connection hole, and the flange holes of the inner flange portion align with the left connection hole;

wherein the poultry behavioral development system further comprises:

a front fastener, which protrudes through front respective inner and outer flange holes and the front connection hole; and a rear fastener, which protrudes through rear respective inner and outer flange holes and the rear connection hole;

such that the front and rear fasteners detachably attach the left top beam mount to the left end plate and the right top beam mount to the right end plate.

8. The poultry behavioral development system of claim 7, wherein the front and rear fasteners are each configured as a screw and a wing nut.

9. The poultry behavioral development system of claim 1, wherein each of the connection assemblies further comprises:

a) a left connection beam mount, which is configured to be detachably attachable to an inner side of the left end plate, such that the left connection beam mount is configured to hold a left end of the connection beam; and b) a right connection beam mount, which is configured to be detachably attachable to an inner side of the right end plate, such that the right connection beam mount is configured to hold a right end of the connection beam.

10. The poultry behavioral development system of claim 9, wherein the left connection beam mount and the right connection beam mount each comprises:

a) a base plate; and b) a receiving structure, which protrudes inward from the base plate, such that the receiving structure defines a receiving interior;

such that a left receiving interior of the left connection beam mount is configured to receive the left end of the connection beam; and
a right receiving interior of the right connection beam mount is configured to receive the right end of the connection beam.

11. The poultry behavioral development system of claim 10, wherein each corresponding receiving structure of the left connection beam mount and the right connection beam mount comprises:
at least one screw aperture, such that the at least one screw aperture protrudes through at least one side of the corresponding receiving structure, such that the at least one screw aperture provides access to a corresponding end of the connection beam, when the corresponding end of the connection beam is inserted into the corresponding receiving interior;
wherein the poultry behavioral development system further comprises a plurality of beam screws;
such that each beam screw is configured to be insertable through the at least one screw aperture, such that the beam screw is screwed into the connection beam, whereby the beam screw prevents lateral movement of the corresponding end of the connection beam.

12. The poultry behavioral development system of claim 10, wherein each corresponding end plate of the left end plate and the right end plate comprises:
a plurality of end plate holes, which each protrude through the corresponding end plate, such that the end plate holes span a surface of the corresponding end plate in equidistant rows and columns;
wherein each corresponding beam mount of the left connection beam mount and the right connection beam mount further comprises:
first and second connection beam mount holes, which each protrude through the base plate, such that the first and second connection beam mount holes are positioned to align with corresponding end plate holes spaced two holes apart; wherein the poultry behavioral development system further comprises:
first and second fasteners, which protrude through the first and second connection beam mount holes, and the corresponding end plate holes, respectively, such that the first and second fasteners secure the corresponding beam mount to the corresponding end plate.

13. The poultry behavioral development system of claim 12, wherein the first and second fasteners are each configured as a screw and a wing nut.

14. The poultry behavioral development system of claim 1, wherein each corresponding end plate of the left end plate and the right end plate comprise:
a plurality of end plate holes, which each protrude through the corresponding end plate, such that the end plate holes span the surface of the corresponding end plate in equidistant rows and columns;
wherein the poultry behavioral development system further comprises at least one accessory;
wherein the poultry behavioral development system further comprises:
a fastener;
wherein the at least one accessory is detachably attached to the corresponding end plate, such that the fastener protrudes through the at least one accessory and a corresponding end plate hole in the plurality of end plate holes.

15. A poultry behavioral development system, comprising:
a) a left end plate;
b) a right end plate; and
c) a plurality of connection assemblies, each comprising:
a connection beam, which is detachably attached between the left end plate and the right end plate, such that preadolescent poultry are enabled to perch on the connection beam;
a left connection beam mount, which is configured to be detachably attachable to an inner side of the left end plate, such that the left connection beam mount is configured to hold a left end of the connection beam; and
a right connection beam mount, which is configured to be detachably attachable to an inner side of the right end plate, such that the right connection beam mount is configured to hold a right end of the connection beam;
wherein the left connection beam mount and the right connection beam mount each comprises:
a base plate; and
a receiving structure, which protrudes inward from the base plate, such that the receiving structure defines a receiving interior;
such that a left receiving interior of the left connection beam mount is configured to receive the left end of the connection beam; and
a right receiving interior of the right connection beam mount is configured to receive the right end of the connection beam;
wherein each corresponding receiving structure of the left connection beam mount and the right connection beam mount comprises:
at least one screw aperture, such that the at least one screw aperture protrudes through at least one side of the corresponding receiving structure, such that the at least one screw aperture provides access to a corresponding end of the connection beam, when the corresponding end of the connection beam is inserted into the corresponding receiving interior;
whereby the preadolescent poultry are enabled to jump between connection beams of the plurality of connection assemblies; and
whereby the connection beam is positionally adjustable between the left end plate and the right end plate, whereby connection beams of the plurality of connection assemblies are initially positionable lower and adjustable higher as the preadolescent poultry grows, in order to promote development of the preadolescent poultry.

16. The poultry behavioral development system of claim 15, further comprising:
a top beam, which is attached to upper ends of the left end plate and the right end plate, such that a center portion of the top beam is mounted between the left end plate and the right end plate;
whereby the preadolescent poultry are enabled to perch on the top beam, and whereby the preadolescent poultry are enabled to jump between the top beam and the connection beams of the plurality of connection assemblies.

17. The poultry behavioral development system of claim 15, wherein the connection beam is configured with a front beveled edge and a rear beveled edge on an upper surface of the connection beam, whereby the connection beam provides an improved grip and promotes healthy development of feet of the preadolescent poultry.

18. The poultry behavioral development system of claim 15, further comprising:
   a) a left top beam mount, which is connected to a top end of the left end plate, such that the left top beam mount secures the top beam to the upper end of the left end plate; and
   b) a right top beam mount, which is connected to a top end of the right end plate, such that the right top beam mount secures the top beam to the upper end of the right end plate.

19. A poultry behavioral development system, comprising:
   a) a left end plate;
   b) a right end plate;
   c) a top beam, which is attached to upper ends of the left end plate and the right end plate, such that a center portion of the top beam is mounted between the left end plate and the right end plate;
   d) a left top beam mount, which is connected to a top end of the left end plate, such that the left top beam mount secures the top beam to the upper end of the left end plate; and
   e) a right top beam mount, which is connected to a top end of the right end plate, such that the right top beam mount secures the top beam to the upper end of the right end plate;
   such that preadolescent poultry are enabled to perch on the top beam;
   wherein each corresponding top beam mount of the left top beam mount and the right top beam mount comprises:
      a top plate; and
      a front protruding flange assembly and a rear protruding flange assembly, wherein each corresponding flange assembly of the front and rear protruding flange assembly comprises:
         an outer flange portion, which is connected to a bottom surface of the top plate, such that the outer flange portion protrudes downward from the top plate; and
         an inner flange portion, which is connected to the bottom surface of the top plate, such that the inner flange portion protrudes downward from the top plate;
      wherein the outer flange portion and the inner flange portion are parallel and configured with a uniform distance, such that the corresponding flange assembly is configured to slide over a top end of a corresponding end plate of the left and right end plates, such that the corresponding top beam mount is configured to slide over and attach to the top end of the corresponding end plate;
   wherein the front protruding flange assembly and the rear protruding flange assembly are each configured with a corresponding beam gap between the front protruding flange assembly and the rear protruding flange assembly, such that the top beam protrudes through the corresponding beam gap;
   whereby, when the left top beam mount slides over the top end of the left end plate and the right top beam mount slides over the top end of the right end plate, the top beam is insertable into a left beam gap and a right beam gap of respectively the left top beam mount and the right top beam mount; and
   whereby the top plate of the left top beam mount prevents the top beam from sliding upwards out of the left beam gap and the top plate of the right top beam mount prevents the top beam from sliding upwards out of the right beam gap.

* * * * *